United States Patent [19]

Malacheski et al.

[11] 4,106,747
[45] Aug. 15, 1978

[54] VALVE CONSTRUCTION

[76] Inventors: Joseph J. Malacheski, 28 E. Division St.; Edward A. Stelmack, 199 Willow St., both of Wilkes-Barre, Pa. 18702

[21] Appl. No.: 751,070

[22] Filed: Dec. 16, 1976

[51] Int. Cl.$^2$ ............................................. F16K 25/00
[52] U.S. Cl. ..................................... 251/84; 251/215; 251/357
[58] Field of Search ................. 251/333, 358, 357, 77, 251/215–227, 88, 205, 210, 84; 137/533.29, 243, 243.4, 625.3

[56] References Cited

U.S. PATENT DOCUMENTS

| 68,733 | 9/1867 | Grant | 251/221 |
|---|---|---|---|
| 92,748 | 7/1869 | Ramsden et al. | 251/221 |
| 955,272 | 4/1910 | Kilbourn | 251/218 |
| 1,662,659 | 3/1928 | Birnstock | 251/212 |
| 2,271,391 | 1/1942 | Drake | 251/88 |
| 2,403,028 | 7/1946 | Smith | 251/210 |
| 3,286,736 | 11/1966 | Guillermic | 251/210 |
| 3,322,145 | 5/1967 | Prosser | 251/205 |

*Primary Examiner*—William R. Cline
*Assistant Examiner*—H. Jay Spiegel
*Attorney, Agent, or Firm*—Robert K. Youtie

[57] ABSTRACT

A valve construction including a seat, a rotatable stem shiftable endwise toward and away from the seat, a washer carried by the stem for movement therewith into and out of closing relation with the seat, the washer being rotatable relative to the stem for nonrotative bearing engagement with the seat, and interfitting guide means for holding the washer against rotation relative to the seat upon movement of the washer into and out of its sealing engagement with the seat.

8 Claims, 3 Drawing Figures

VALVE CONSTRUCTION

BACKGROUND OF THE INVENTION

In the general field of valves, and specifically faucet valves, it is conventional to carry a washer on the end of a rotary stem to rotate the washer into and out of a frictional bearing engagement with the seat to close and seal the latter. As is well known, this simultaneous rotation and frictional bearing engagement of the washer against the seat causes relatively rapid wear necessitating frequent washer replacement. As substantial washer wear commences immediately upon use, requiring harder and harder closing of the valve as the use proceeds, it will be appreciated that prior valve constructions of the faucet type are not highly satisfactory.

SUMMARY OF THE INVENTION

It is, therefore, an important object of the present invention to provide a valve construction, particularly for use in faucets, which obviates rotative frictional bearing engagement with the washer, the washer being subjected only to substantially pure compression so that washer wear is very considerably reduced, resulting in greatly enhanced washer life, relative ease of faucet operation to open and close, and very greatly reduced maintenance and frequency of washer replacement.

It is still another object of the present invention to provide a faucet construction of the type described, having the advantageous characteristics mentioned in the preceding paragraph, wherein a single size washer may be employed for a substantial range of faucet sizes, so as to considerably reduce manufacturing and inventory costs, and which is capable of being more easily maintained, both by reduced frequency of washer replacement, and enhanced simplicity of the same.

Other objects of the present invention will become apparent upon reading the following specification and referring to the accompanying drawings, which form a material part of this disclosure.

DESCRIPTION OF THE PREFERRED EMBODIMENT

Figure 1:
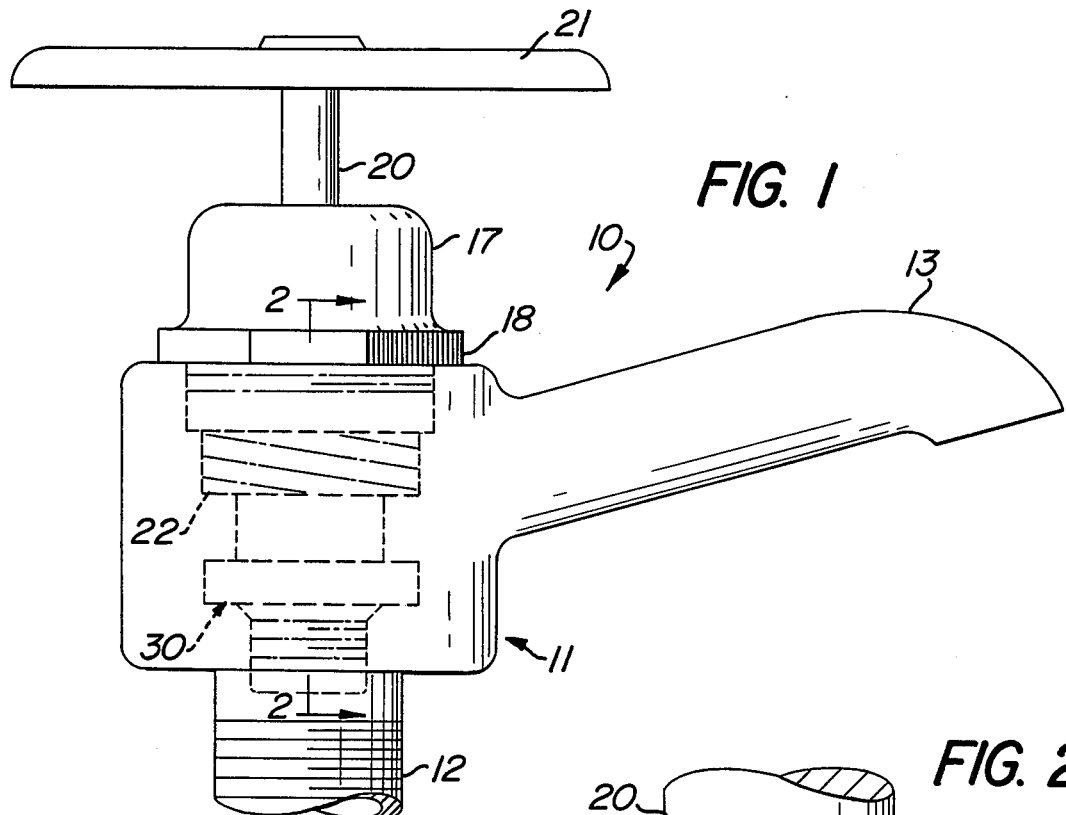
FIG. 1 is a side elevational view showing a faucet constructed in accordance with the teachings of the present invention.

Referring now more particularly to the drawings, and specifically to FIG. 1 thereof, a faucet type valve is there generally designated 10, including a hollow housing 11 having a depending inlet 12. The hollow housing 11 may be provided with an outstanding outlet 13, both the inlet 12 and outlet 13 communicating with the interior hollow 15, see FIG. 2, of housing 11. The interior 15 of the housing 11 opens upwardly, as through an internally threaded opening 16 for threadedly receiving a bonnet or plug 17 depending into and closing the upper opening of the housing. A shoulder 18 may be circumposed about the plug 17 to seat on the upper side of the housing 11 when the plug is engaged in closing relation in threaded opening 16.

The plug 17 may be provided with a through, internally threaded passageway 19, through which extends the rod or stem 20.

On its outer end the stem 20 may be provided with a handle 21. Within the plug 17 the stem may be provided with external screw threads 22 in mating engagement with the internal threads of the through opening 19. Thus, the stem 20 is mounted for rotative movement within the plug 17, and longitudinal displacement upon said rotative movement.

The stem 20 is generally in axial alignment with the outlet 12; and, the inner end of the stem 20 adjacent to the outlet 12 may be provided with a generally circular cavity or recess 23. The inner wall 25 of the cavity may be generally flat and bounded by a generally angular peripheral rim 26. Centrally within the cavity, extending through the inner wall 25, may be an internally threaded hole 27.

As thus far described, the faucet structure may be generally conventional. Also, the instant invention is not limited to the conventional faucet structure shown, but may be advantageously employed with other types of faucet structures, if desired.

A valve seat is generally designated 30 and may include an externally threaded tubular portion or nipple 31 threadedly engaged in inlet 12. Interiorly of a nipple 31 may be provided one or more wrench engaging formations 32 to facilitate removal and replacement of a valve seat with respect to the housing 11.

Figure 3:
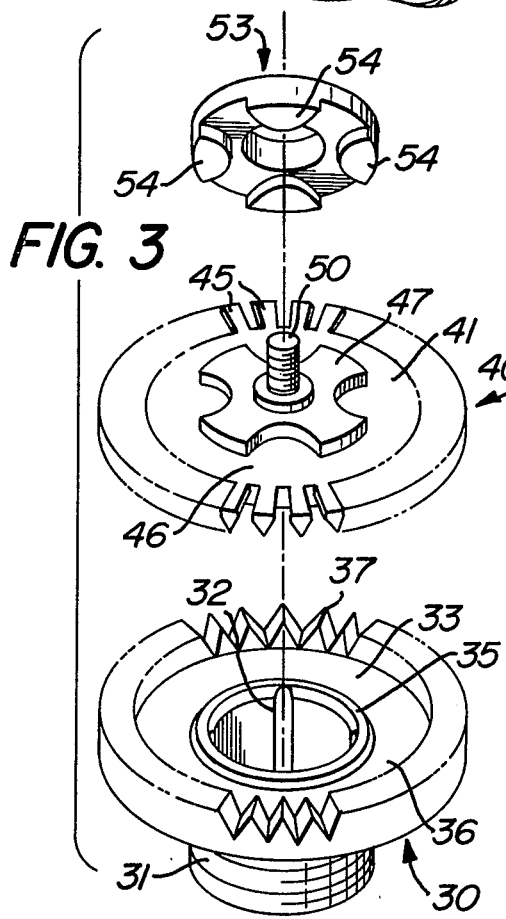
FIG. 3 is an exploded perspective view showing the novel elements of the instant faucet apart from the remainder thereof.
Figure 2:
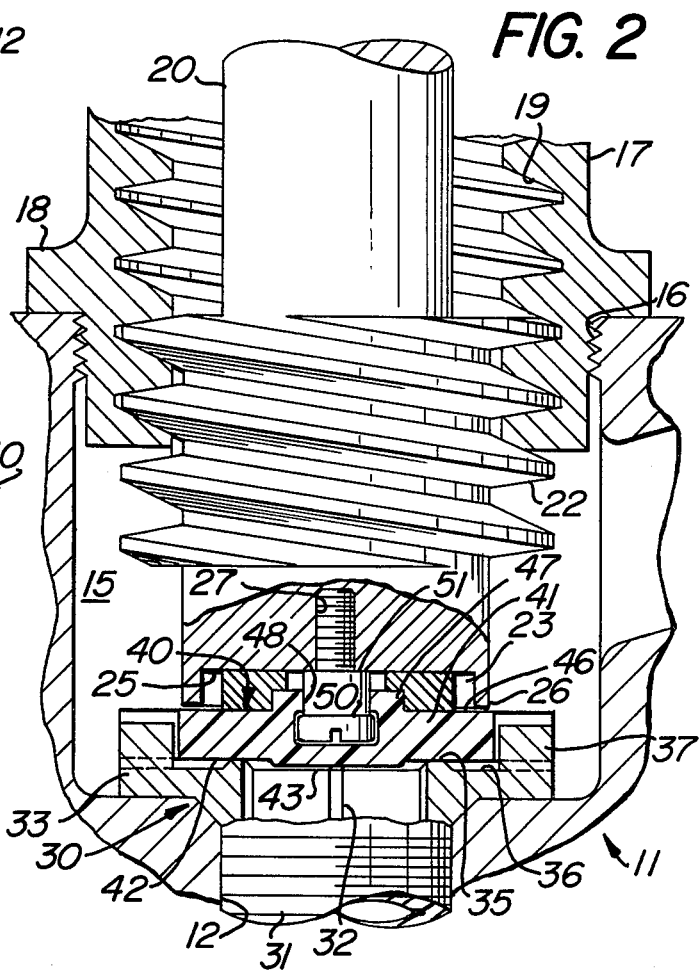
FIG. 2 is a partial sectional elevational view taken generally along the line 2—2 of FIG. 1.

Outstanding from the upper or inner region of the nipple 31 is a generally circumferential flange 33 seated on the adjacent internal surface of housing hollow 15. On the upper or inner side of flange 33, bounding the passageway of nipple 31, is a generally annular ridge or land 35 defining a valve seat proper. Surrounding the valve seat proper 35, the upper or inner surface 36 of flange 33 is depressed or recessed below the valve seat proper. Spaced radially outwardly from the valve seat proper, the flange 33 is provided with an annular array of upstanding, upwardly tapering guide teeth 37. This construction of the valve seat 30 is best seen in FIGS. 2 and 3. Any suitable material may be employed to fabricate the valve seat 30, such as conventional nonferrous materials, or other.

A valve element or washer is generally designated 40, and is carried on the inner end of stem 20 for movement into and out of closing relation with the valve seat 30, and specifically into and out of sealing engagement with the valve seat 35. The washer 40 may be suitably fabricated of resiliently deformable material, such as rubber, or the like, and may include a central disc portion 41 having its underside 42 generally flat so as to be configured for conforming engagement with the seat proper 35 to close and seal the latter. Centrally of the undersurface 42 may be a depending protrusion or enlargement 43 to afford the washer additional bulk in its central region. The protrusion 43 may freely enter the outlet nipple 31 spacedly within the seat proper 35, so as to cause no obstruction or interfere with sealing.

The outer peripheral bounding region or margin of washer 40 is formed with an annular array of teeth 45, which array is located in direct coaxial alignment with the tooth array 37 of the seat 30. The teeth 45 are spaced apart or pitched a distance equal to the spacing or pitch of the teeth 37, and the former teeth may converge or taper downwardly or inwardly toward the seat. Thus, upon movement of the washer 40 toward the seat 30, the teeth 45 are configured for an alternate interfitting relation with teeth 37, the tapering configuration assuring free intertooth engagement and serving to substantially nonrotatively guide the washer 40 toward the seat proper 35 into sealing engagement therewith.

On the upper side 46 of the washer 40, centrally thereof, may be an upstanding protrusion or boss 47 of noncircular configuration, say generally cruciform. A central undercut hole or recess 48 may be formed in the upper side of the washer 40, opening centrally through a reduced upper portion in boss 47 and opening therefrom, for a purpose appearing presently. The washer, as thus far described, may be integrally fabricated, say by molding of rubber, or otherwise formed of any suitable material.

A headed fastener or spindle 50 may have its enlarged head engaged rotatably into the undercut region of recess or hole 48, extending upwardly, rotatably through and out of the recess for threaded engagement in the stem end hole 27. The fastener or spindle 50 is provided with a shoulder 51 for limiting abutment with the inner surface 25 of recess 23, to assure free rotation of the washer 40 about the spindle 50, as will appear more fully hereinafter.

A generally annular or disc-like backing member 53 is circumposed about the spindle 50, within the stem end recess 23, and interposed between the washer 40 and inner wall 25 of the stem end recess. The backing member 53 is preferably fabricated of stiff wear-resistant material, which may be metal, if desired, and includes a plurality of boss formations or lugs 54 configured for nonrotative interfitting engagement with the boss 47 of washer 40. Thus, the washer 40 and backing member 53 are effectively nonrotative relative to each other, while being rotatable together relative to the stem 20, about the axis of spindle 50.

In operation, the forced closed condition being shown in FIG. 2, it will there be apparent that the spindle 20 is axially rotatable in the plug 17 to shift the washer 40 longitudinally of the spindle toward and away from the valve seat 30. In the closed condition shown, further closing rotation of the stem 20 would shift the stem closer toward the valve seat proper 35. As the washer 30 is restrained against rotation by interfitting engagement of valve seat teeth 37 and washer teeth 45, and as the backing member 53 is nonrotatable relative to the washer 40, relative rotation may only occur between the stem 20 and backing member 53. This relative rotation and wear occasioned thereby is spread over substantial areas of relatively hard materials, so that only negligible wear occurs. Thus, the washer 40 is moved substantially non-rotatably into bearing engagement with the seat proper 35, and compressed thereagainst by force transmitted through the backing 53. It is therefore essential that the backing member be of a diameter at least approximating that of the valve seat proper. As best seen in FIG. 2, the radially projecting teeth 45 are, with the washer surface 42 in sealing engagement, appreciably spaced over the root of teeth 37, to accommodate for washer wear by compression.

It will be understood that, as washer fit in the recess 23 is not critical, as in prior art constructions, and as a single size of washer 40 and backing member 53 may be employed with a range of different sizes of stems 20, it is not necessary that as great a number of different washer sizes be manufactured or inventoried. Also, in the relatively less frequent event of replacing washers, this is more simply accomplished by merely snapping a washer over the spindle 50.

From the foregoing, it is seen that the present invention provides a valve construction which substantially eliminates rotative frictional bearing engagement between the washer and valve seat, to greatly enhance washer life, ease faucet operation, and otherwise fully accomplishes its intended objects.

Although the present invention has been described in some detail by way of illustration and example for purposes of clarity of understanding, it is understood that certain changes and modifications may be made within the spirit of the invention

What is claimed is:

1. A valve construction comprising a seat, a stem having one end facing toward said seat, threaded stem mounting means mounting said stem for simultaneous axial spiral rotation and longitudinal shifting toward and away from said seat, a washer at said one end of said stem, washer mounting means mounting said washer for shifting movement with said stem toward and away from bearing engagement with said seat and rotation relative to said stem, and separable interfitting formations on said seat and washer movable into and out of engagement with each other upon washer movement toward and away from said seat for holding said washer against rotation upon washer movement into said bearing engagement, said interfitting formations comprising an annular array of teeth on each of said seat and washer, said teeth of said seat and washer respectively tapering in the directions toward said washer and seat to assure meshing engagement therebetween.

2. A valve construction according to claim 1, in combination with a backing member of relatively nondeformable material interposed between said one end of said stem and said washer for reinforcing the latter against distortion sealing engagement with said seat.

3. A valve construction according to claim 2, said backing member being rotatable with said washer relative to said stem.

4. A valve construction according to claim 3, in combination with nonrotative connection means between said backing member and washer to assure rotation of said backing member with said washer.

5. A valve construction according to claim 2, said washer mounting means comprising a headed spindle extending axially from said one end of said stem, said washer being rotatably circumposed about said spindle, and said backing member being rotatably circumposed about said spindle sandwiched between said washer and stem and located therebetween for transmitting compressive force between said stem and washer.

6. A valve construction according to claim 5, said one stem end having a recess receiving said backing member.

7. A valve construction according to claim 5, said teeth being located radially beyond said seat.

8. A valve construction according to claim 5, said washer having an undercut recess on one side for snap reception and rotatable retention on the spindle head.

* * * * *